Dec. 24, 1929.	K. O. MUEHLBERG	1,740,664

TUBE COUPLING

Filed June 12, 1925

INVENTOR.
Karl O. Muehlberg.
BY
Morsell, Keeney & Morsell,
ATTORNEYS.

Patented Dec. 24, 1929

1,740,664

UNITED STATES PATENT OFFICE

KARL O. MUEHLBERG, OF MANITOWOC, WISCONSIN

TUBE COUPLING

Application filed June 12, 1925. Serial No. 36,683.

This invention relates to improvements in tube couplings more particularly adapted for connecting flexible tubes to a coupling member.

Flexible metal tubes used for gasoline and other fluids are usually formed of an interlocked spirally trending strip of metal covered with woven layers of fabric, some of the layers of which are coated with gelatinous composition. It has been found very difficult to satisfactorily attach metal coupling members to the ends of tubes of this type and form a fluid tight connection due to the yielding nature of the covering material of the tube and also due to the fact that the tube ends are usually cemented to the cement coupling members and the cement ofttimes breaks away from the parts. Furthermore when the parts are cemented together they are not held sufficiently firm to withstand the pulling strain which they are often subjected to while in use.

It is one of the objects of the present invention to overcome the before mentioned objectionable features and provide a tube coupling member which may be firmly and positively connected to a flexible metal tube in such a manner as to form a fluid tight joint without the use of cement or other adhesive material.

A further object of the invention is to provide a tube coupling which may be easily and removably attached to a flexible metal tube end and which will serve as part of a coupling union or as a means for connecting a pipe thereto.

A further object of the invention is to provide a tube coupling in which the bore of the coupling member is maintained as large as the tube to which it is connected to form an unrestricted opening therethrough.

A further object of the invention is to provide a tube coupling in which the fabric or other material covering the metal portion of the flexible tube is also used as a packing for sealing the joint between the tube and the coupling member.

A further object of the invention is to provide a tube coupling in which a split clamping member is used which is provided with annular clamping ridges for engaging the hose to be connected.

A further object of the invention is to provide a tube coupling which is of simple construction, is easily assembled and is well adapted for the purpose described.

With the above and other objects in view the invention consists of the improved tube coupling and its parts and combinations as set forth in the claims, and all equivalents thereof.

In the accompanying drawing in which the same reference characters indicate the same parts in all of the views.

Figure 2:
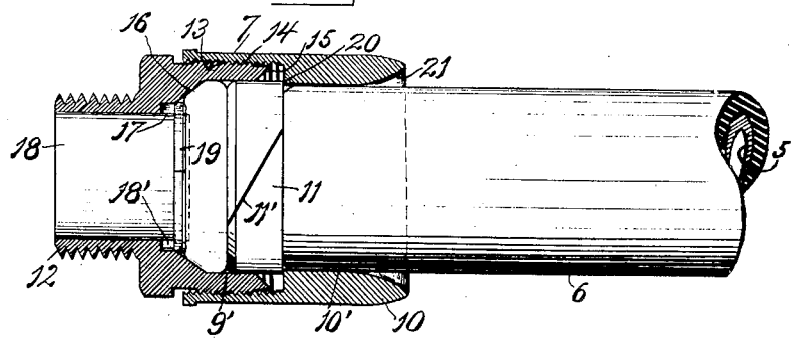
Fig. 2 is a similar view with the parts assembled in clamping position.
Figure 3:
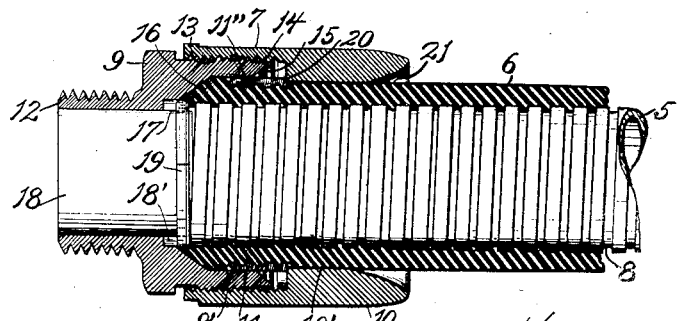
Fig. 3 is a longitudinal sectional view of the tube and the coupling.

Referring to the drawing the numeral 5 indicates the end portion of a piece of spirally wound flexible metal tubing, 6 the outer covering of fabric and other material and 7 the improved coupling therefor. The flexible metal tubing in the course of manufacture forms a spirally trending groove 8 between its convolutions into which the covering material extends and securely binds the parts together. The improved coupling 7 comprises the attaching member 9, the tube engaging coupling member 10 and the split annular clamping member 11 which is interposed between the two coupling members. The inside coupling member 9 is of tubular form and is provided with a threaded reduced end portion 12 for connection with another coupling member or pipe. The said coupling member at its other end is provided with an outside thread 13 for connection with the inside thread 14 of the outer tube coupling member 10. Said inner coupling member 9 is formed with an inner edge taper 15 and an intermediate taper 16 and is also provided with an inner annular flange 17 formed by extending a snugly fitting tube 18 within the bore of the coupling. This flange 17 forms an annular recess 18' for holding a split lead packing ring 19 which is engaged by the inner end portion of the fabric portion 6 of the flexible tube 5. The outer coupling member 10 is formed with an inner annular shoulder 20 which bears against the outer edge of the split clamping member 11 when the parts are assembled together as shown in Figs. 2 and 3. The said clamping member 11 is preferably split diagonally and is of a diameter when in closed position to snugly fit within the larger bore portion 9' of the inner member 9, while the diameter of the bore 10' of the member 10 is slightly smaller than the bore 9' and also of less diameter than the periphery of the clamping member 11 when in closed position so that the shoulder 20 will always bear against the said split ring in forcing it into clamping position. The clamping ring 11 is split diagonally to form edgewise overlapping ends 11' and the ends are so spaced that when the member is in closed or contracted position the ends will abut against each other and the outer diameter of the clamping member will correspond to the diameter of the bore 9' of the attaching member 9. Annular ribs 11" are formed on the inner surface of the split ring 11 to more firmly clamp the flexible tubing. The outer end portion of the bore 10' is tapered outwardly as indicated by the numeral 21 in order not to injure the flexible tube.

Figure 1:
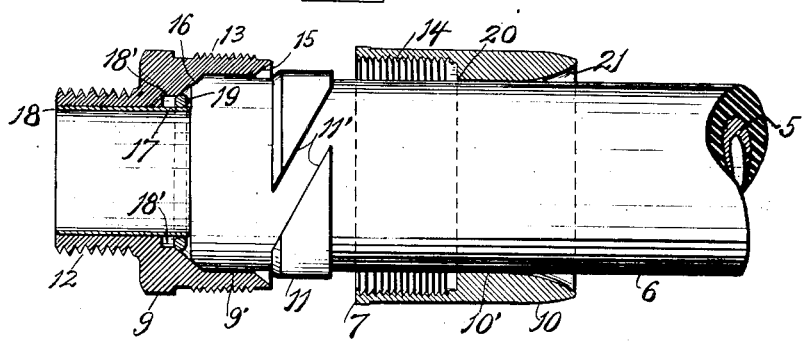
Fig. 1 is a side view of a flexible metal tube with the improved coupling member mounted thereon and before the parts are assembled, the said member being shown partly in section.

In use the split lead ring 19 is placed within the annular recess 18', the outer or tube engaging coupling member 10 and the split clamping member 11. The end of the flexible tube is then inserted in the bore of the attaching member 9, as shown in Fig. 1, and the coupling members are then threaded together, as shown in Figs. 2 and 3. In threading the coupling members together, the front beveled edge portion of the split clamping ring engages the beveled edge 15 of the attaching member, and the ring is forced to closed position around the flexible tube as clearly shown in Fig. 3. In moving to closed position the clamping ring will force the end of the flexible tube against the beveled surface 16 and also against the packing ring 19 and form a sealed joint between the coupling and the flexible tube. The straight portion of the bore 11 of the attaching coupling member firmly holds the clamping ring in closed position without liability of bending at an angle while the bore 10' of the other coupling member is of less diameter to engage the clamping member and to more snugly fit the flexible tube.

The split lead ring not only serves as a packing ring between the flexible tube and the coupling member, but said packing ring also serves to form a metallic connection between the inner metal portion of the flexible tube and the coupling member in order to prevent any possibility of frictional electricity jumping across the gap between the coupling and the inner metal lining, provided said metal ring was not placed therebetween. This ring serves to ground the inner metal portion of the flexible tube, as the containers or other receptacles containing gasoline, are usually connected to the ground and the coupling member is connected to the container.

From the foregoing description it will be seen that the tube coupling is of very simple construction, and is well adapted for the purpose described.

What I claim as my invention is:

1. A tube coupling, comprising an inner coupling attaching member having a medial straight bore portion and tapered end portions thereto of different diameters and also having an annular recess adjacent the inner end taper of less diameter, a packing ring positioned within the annular recess, a split annular clamping member positioned within the attaching member and engageable with the tapered portion of larger diameter, said tapered portion of smaller diameter devised to be sealingly engaged by the end portion of the flexible tube upon which the coupling is mounted, and an outer tubular coupling member surrounding said flexible tube and having a threaded connection with the inner coupling member and also having an inner shoulder engageable with the edge portion of the clamping member for forcing said clamping member into engagement with the tapered portion of larger diameter and also into the straight portion of the bore of the inner coupling member.

2. A tube coupling, comprising an inner coupling member having a medial straight bore portion with an outer tapered end, said member also having another inner bore of less diameter and a tapered connection between the two bores which is of less diameter than the outer tapered end, a tube extending into the bore of less diameter and forming a flange and an annular recess adjacent the taper of less diameter, a soft metal packing ring within the annular recess, said tapered portion of smaller diameter and the packing ring devised to be sealingly engaged by the end portion of the flexible tube upon which the coupling is mounted, a split annular clamping member within the inner member and surrounding the flexible tube, and an outer tubular coupling member having a threaded connection with the inner coupling member and also having an inner annular shoulder engageable with the edge portion of the clamping member for forcing said clamping member into engagement with the tapered portion of larger diameter and also into the straight portion of the bore of the inner coupling member.

3. A tube coupling, comprising an inner coupling member having a medial straight bore portion with an outer tapered end, said member also having another inner bore of less diameter and a tapered connection between the two bores, a tube extending into the bore of less diameter and forming a flange and an annular recess adjacent the inner taper of less diameter, a soft metal packing ring within the annular recess, said inner tapered portion of smaller diameter and the packing ring devised to be sealingly engaged by the inner end portion of the flexible tube upon which the coupling is mounted, a split annular clamping member within the inner member and surrounding the flexible tube, said clamping member having inner annular ribs which imbed into the flexible tube to move said tube longitudinally when said clamping member is in engagement with the outer tapered end or with the straight portion of larger diameter, and an outer tubular coupling member having a threaded connection with the inner coupling member and also having an inner annular shoulder engageable with the edge portion of the clamping member for forcing said clamping member into engagement with the tapered portion of larger diameter and also into the straight portion of the bore of the inner coupling member to force the end of the flexible tube engaged into sealing engagement with the taper of less diameter.

In testimony whereof, I affix my signature.

KARL O. MUEHLBERG.